C. D. WOODWARD.
DEVICE FOR NAVIGATING BY THE NORTH STAR.
APPLICATION FILED JAN. 31, 1917.

1,240,525.

Patented Sept. 18, 1917.

WITNESS:
Rob. R. Kitchel.

INVENTOR.
Charles D. Woodward
BY
Augustus B Stoughton
ATTORNEY.

UNITED STATES PATENT OFFICE.

CHARLES D. WOODWARD, OF PROVIDENCE, RHODE ISLAND.

DEVICE FOR NAVIGATING BY THE NORTH STAR.

1,240,525.

Specification of Letters Patent.  Patented Sept. 18, 1917.

Application filed January 31, 1917. Serial No. 145,603.

*To all whom it may concern:*

Be it known that I, CHARLES D. WOODWARD, a citizen of the United States, and a resident of Providence, in the county of Providence and State of Rhode Island, have invented a certain new and useful Device for Navigating by the North Star, of which the following is a specification.

At high altitudes and under certain other conditions the deviation and behavior of a mariner's compass are such as to leave a great deal to be desired for the navigation of, more particularly, air-craft, but also in some instances of ships.

In Letters Patent of the United States No. 1,188,522 of June 27th, 1916, I have described apparatus for navigation by the sun but that apparatus is, of course, not useful at night.

The principal object of the present invention is to provide a comparatively simple, accurate, efficient and convenient apparatus for navigating at night by means of the north star.

In the following description I shall refer to the use of the apparatus in connection with air-craft, but in doing so I do not intend to exclude its use for other purposes.

Stated generally the invention consists of the improvements to be presently described and finally claimed.

Figure 1:
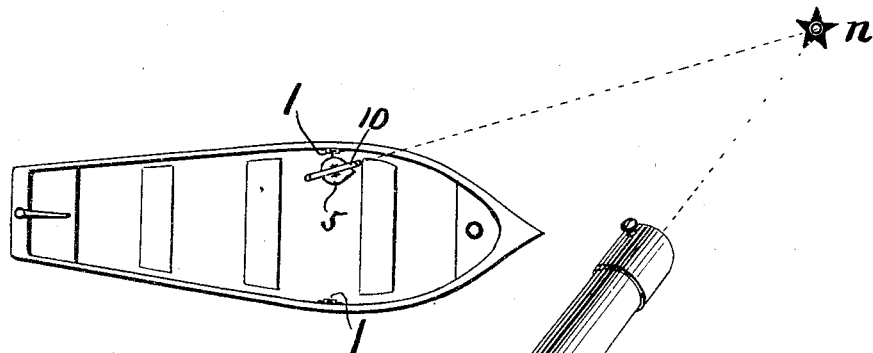

I have chosen an embodiment of the invention for illustration in the accompanying drawings, in which Figure 1, is a diagrammatic view which will be referred to for purposes of explanation.

Figure 2:
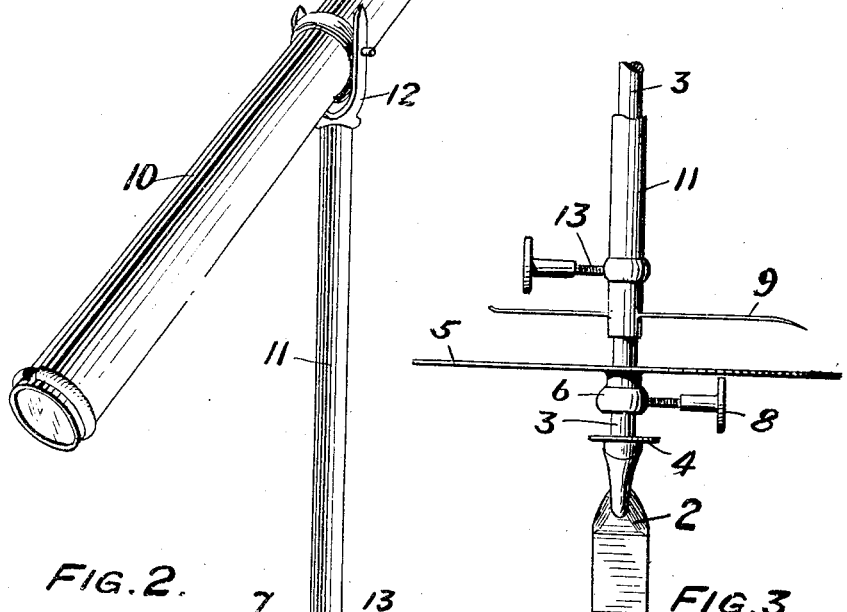
Figure 3:
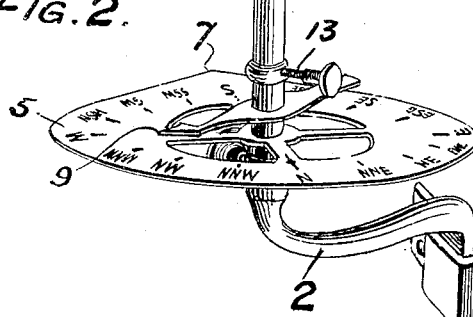

Fig. 2, is a perspective view of an instrument for navigating by the north star embodying features of the invention, and Fig. 3, is an elevational view of a part of the apparatus or device.

In the drawings 1 is a clip and a number of them may be provided and arranged at different points, so that the device itself can be moved into a position convenient for the navigator. 2, is a bracket adapted for detachable connection with the clip 1 and provided with a spindle 3 having a shoulder 4. 5, is a dial turnable on the spindle and shown as having its hub 6 adapted to rest on the shoulder 4, although in Fig. 3 the hub is shown as lifted above the shoulder 4 in order to more clearly illustrate the construction. This dial is provided with a "lubber line" pointer 7 and is marked with the points of the compass; the "lubber line" pointer being in line with the markings "north" and "south." As shown the marking is somewhat peculiar in that the "east" and "west" are reversed from what they are on an ordinary compass dial. 8, is a set screw for clamping the dial on the spindle in any position to which it may be adjusted and, of course, for permitting the dial to be turned on the spindle while resting on the shoulder 4. 9 and 10 are an interconnected sight and pointer. As shown they are connected by a base 11, consisting of a tube or sleeve turnable on the spindle 3. The sight 10, since it is used in connection with the north star, may well be a telescope, and it is so shown and is pivotally mounted in a fork 12 so that it can be turned to suit various inclinations. 13, is a set screw for permitting the interconnected pointer and sight to be turned through the same angle in respect to the spindle 3 and clamped in any position into which they may be turned.

In use the bracket of the instrument is mounted in a clip convenient to the navigator. The navigator then turns the dial so that its north and south corresponds with the "lubber line" of the craft; the south being toward the front or bow. The north and south line of the dial may coincide with the "lubber line" of the craft or be parallel with it. The dial is then clamped to the spindle 3 by means of the set screw 8. The navigator then, keeping the index 9 toward him, turns it to the marking on the compass which corresponds with the desired course. In doing this the sight 10, of course, turns with the pointer and then by the set screw 13, the sight and pointer are clamped to the spindle 3. The navigator now turns the craft until the sight is on the north star and by keeping the sight on the north star the desired course is held.

While Fig. 1 suggests a boat rather than an aircraft, still it is but a diagrammatic view and will be referred to for the sake of further explanation.

Assuming that the lubber or center line of the boat is perpendicular on the plane of the paper and that the desired course is something east of north, the navigator sets the dial so that its north and south line corresponds with the "lubber line" of the boat and clamps the dial to place. The "south" on the dial being toward the bow of the boat and the "north" on the dial being toward the stern of the boat. He then turns the index 9 east of south in correspondence with the desired course, which similarly turns the sight and sets the dial and sight against further movement. He then turns the boat until the sight is on the north star $n$, and by reference to Fig. 1, it will be seen that the course of the boat is something east of north which was the desired course. Under the assumption made, east is of course generally at the lower right-hand corner of the sheet. It may be suggested that in the case of an air-craft it is possible by ascending to the proper altitude to see the north star even though atmospheric conditions at a lower altitude might prevent it and this is one of the reasons why the invention is particularly applicable to air-crafts.

From the foregoing description it is evident that modifications may be made in details of construction and arrangement and hence the invention is not limited as to those matters or in any way other than the prior art may require in connection with the following claim.

What I claim is:

A device for navigating by the north star comprising the combination of a dial having reverse compass markings whereof the south marking is designed to be permanently fixed forward and in lubber line position on a vessel and a sight adjustable with respect to the reverse compass markings in correspondence with the course desired, whereby when the sight is on the north star the lubber line is in true compass direction of the desired course, and means for fixing the sight in the described relation to the fixed reverse compass marking for different new courses.

CHARLES D. WOODWARD.